INVENTOR.
Lloyd J. Derr

Dec. 8, 1964     L. J. DERR     3,160,825
TEMPERATURE-COMPENSATING MEANS FOR CAVITY
RESONATOR OF AMPLIFIER
Filed June 19, 1961     2 Sheets-Sheet 2

INVENTOR.
Lloyd J. Derr
BY
Attorneys

United States Patent Office 3,160,825
Patented Dec. 8, 1964

3,160,825
TEMPERATURE-COMPENSATING MEANS FOR CAVITY RESONATOR OF AMPLIFIER
Lloyd J. Derr, La Crescenta, Calif., assignor, by mesne assignments, to the United States of America as represented by the Administrator of the National Aeronautics and Space Administration
Filed June 19, 1961, Ser. No. 118,169
2 Claims. (Cl. 330—49)

This invention relates to structures for compensating micro-wave cavity devices for variations in temperature and more particularly to improvements therein.

Micro-wave devices such as cavity amplifiers and filters de-tune with temperature and thus degrade their performance at the frequency at which they are designed to operate. Such de-tuning is due to dimensional changes with temperature and also to changes in the output capacity of an amplifier tube with temperature. The latter change only applies to the amplifier type cavities and not to filters. It is desirable to maintain a constant performance of a cavity amplifier and filter regardless of thermal changes to which the device may be subjected. The tuning due to temperature brings about an "off-resonance" shift in cavity filters and results in a degraded performance in cavity amplifiers. As much as 1 to 6 db degradation may be experienced over a temperature range of from —10° C. to +80° C. Regardless of the origin or nature, de-tuning effects in cavities due to thermal changes can be viewed as an unwanted capacity change across the resonant elements of the device.

An object of this invention is to provide a simple structure for compensating micro-wave devices for unwanted de-tuning due to temperature changes.

Another object of this invention is the provision of a novel and inexpensive arrangement for compensating micro-wave cavity devices for unwanted capacity changes due to changes in temperature.

Another object of this invention is the provision of a unique and inexpensive arrangement in a micro-wave cavity device for nullifying unwanted capacitive and inductive changes in the resonant elements regardless of temperature changes.

These and other objects of the invention are achieved by the provision of a thermally sensitive tuning probe which reacts to temperature changes within a cavity in such a way as to nullify unwanted capacitive and inductive changes in the resonant elements (and the tube in the case of a cavity amplifier). Regardless of how the cavity is tuned, inductively or capacitively, the probe can compensate for the unwanted thermal effects throughout the tuning range of the cavity. The probe includes a material having a much greater coefficient of expansion than the metal of the micro-wave cavity. This material and a capacitive plate are supported relative to one another in a manner to move the plate within the cavity to provide the required compensating effects.

The novel features that are considered characteristic of this invention are set forth with particularity in the appended claims. The invention itself, both as to its organization and its method of operation as well as additional objects and advantages thereof will better be understood from the following description when read in connection with the accompanying drawings in which:

Figure 1:
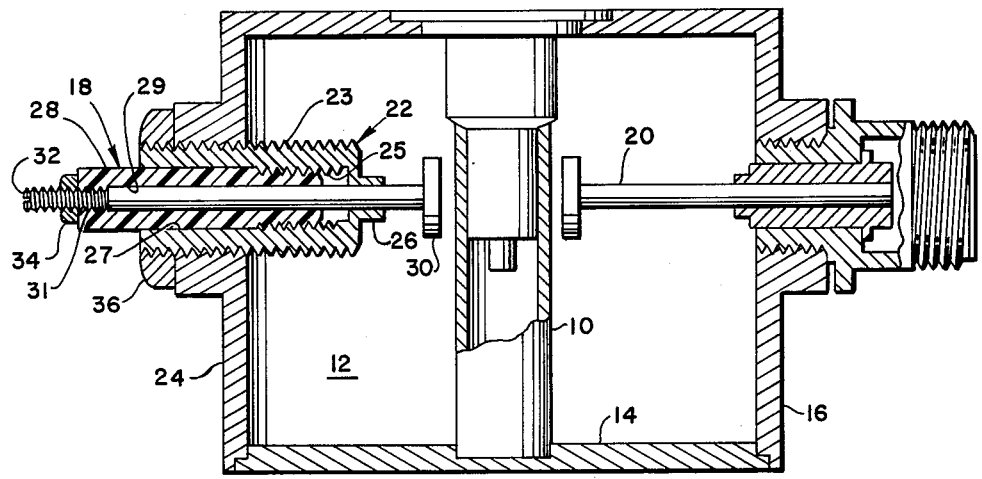
FIGURE 1 is a partial view of a cavity amplifier in section which includes an embodiment of the invention.

Reference is now made to FIGURE 1 which shows a portion of a cavity amplifier in section. The portion of the cavity amplifier which is shown is known as the plate section. The plate section 10 of an amplifying tube extends into cavity 12 from the cathode section not shown. It terminates in a plate member 14 which assists in holding it centered to the axis of the cavity 12 and constitutes the electrical end of the tuned cavity. The walls 16 of the cavity support a tuning probe 18 which is an embodiment of this invention, and also the usual output probe 20 which is capacitively spaced from the plate line 10.

The probe 18 includes an outer sleeve 22 having a substantial uniform diameter throughout and a reduced collar portion 26 on its internal end. This outer sleeve 22 is essentially screw threaded in its entire length with the threads 23 between the external end and the collar 26 so that it can be positioned in the side wall 24 of the cavity by screw thread engagement. Internally the outer sleeve 22 is provided with an axially disposed bore 27 with internal screw threads 25 adjacent the internal end of bore 27 whereby an internal sleeve 28, which is externally screw threaded on its internal end, threadedly engages the internal screw threads 25 to adjustably mount the internal sleeve 28 within the outer sleeve 22. The inner sleeve 28 will thus move axially with the outer sleeve 22 when the probe and cavity are subjected to temperature changes. An axially disposed bore 29 is centrally located in the inner sleeve member 28 and provides a means for mounting the tuning probe 30 within the cavity 12. The external end 32 of the tuning probe 30 is externally screw threaded and engages the internal screwthreads 31 disposed in the outer end of the internal sleeve member 28. Thus, the probe member 30 is in screw thread engagement with the sleeve member 28, whereby axial movement of the internal sleeve member 28, due to expansion and contraction of the internal sleeve 28 and outer sleeve 22 during temperature changes will move the tuning probe 30 therewith. In order to set the tuning probe 30 in various axial relationships to the sleeve member 28, a lock nut 34 is provided at the threaded end of the tuning probe member 30. There is also provided on the external thread 23 on the outer sleeve member 22, a lock nut 36 to prevent the outer sleeve 22 from moving relative to the cavity wall 24.

The sleeve member 28 made of a material having a much higher thermal expansion ratio than the surrounding metal of the compensator housing. The length of this sleeve member is dictated by the distance which the probe is required to move for proper compensation for variations due to temperature changes. The longer the sleeve, the greater the probe movement with temperature. The probe is grounded to the chassis through contact with the collar 26. It has been found that a material such as nylon is very rigid and has an expansion coefficient about five times that of the metal. Therefore, by using small lengths of this nylon sufficient compensating motion of the probe is obtained.

To see what happens in more detail consider a rise in temperature has occurred. The outer sleeve member 22 is held at its outer end threaded in the cavity wall so that with the temperature rise the end within the cavity moves or expands toward the plate line. This would carry the tuning probe 30 closer to the plate line. In view of the fact that the sleeve member 28 has its inner end threaded in the member 22 the outer end of the nylon sleeve member moves in a direction opposite to that of the sleeve member 22 carrying the probe 30 with it, thereby compensating not only the change in the length in the probe carrying member or sleeve 22, but also for any other capacitive changes which can and do occur within the cavity.

Figure 2:
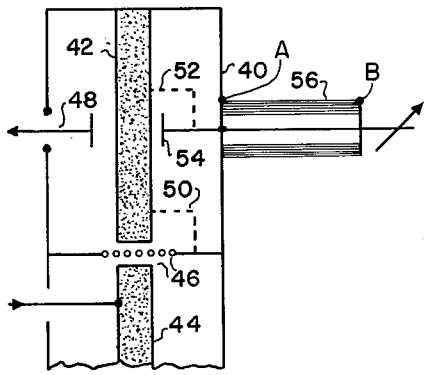
FIGURE 2 is a schematic drawing illustrating the theory of the operation of the embodiment of the invention.

To show what occurs in more detail reference is now made to FIGURE 2 which is a schematic diagram of a micro-wave cavity amplifier. This includes the cavity wall structure 40, the plate line 42, the cathode line 44, a grid structure 46 between the cathode and plate lines. The RF input is connected to the cathode line through the wall of the cavity in well known fashion and a probe 48, as is well known, is capacitively spaced from the plate line and affords an output from the amplifier. The tube is normally tuned by the capacitance $C_{pg}$ normally known as plate-to-grid capacitance which is represented by the capacitor 50 shown in dotted lines between the plate line and the grid structure. Also, there is included the capacitance $C_g$ represented by the dotted capacitor 52. This capacitance exists between the tuning probe 54 and the plate line 42. The capacitances 50 and 52 serve to tune the output cavity in the amplifier to desired frequency of operation. The capacity 50 which is the plate capacity in the tube has a positive coefficient and increases with a rise in temperature whereas the tuning capacity of the probe 52 (which need not be equal to the capacitance) in order to afford compensation for the positive coefficient capacitance, it must have a negative coefficient and must change at a rate equal and opposite to the rate of change of capacitance 50 with respect to temperature. In accordance with this invention the tuning probe is supported by a sleeve 56, preferably made of nylon which is fixed to the cavity wall at the point A. The tuning probe is attached to the nylon sleeve at the point B. As the temperature rises the nylon expands moving point B and the probe outward from the cavity and away from the plate line. This serves to reduce the value of the capacitance 52 and thereby establishes its negative characteristic with temperature. The rate of capacitance change is established by the physical length of the nylon sleeve which can be cut to cancel any changes in the output capacity of the tube plus any dimensional de-tuning of the cavity as well.

It should be appreciated that any cavity filter which does not include an active element such as the tube may be thermally compensated by supporting in the manner described. A tuning probe which moves relative to any other structure within the cavity with which it establishes a capacitive relationship for tuning that cavity, such motion being in a direction to hold to the spacing of the probe relative to that structure to compensate for a change in the tuning of that cavity. A change in capacitance can compensate for a change in the inductance of a cavity as well as for a change in capacitance. This is effectuated because of the fact that the tuned circuit provided by a cavity in lump constant form represents a capacitor in parallel with an inductance. The tuning of the parallel resonance may be maintained constant in the face of the change in the inductance by changing the capacitance accordingly.

Figure 3:
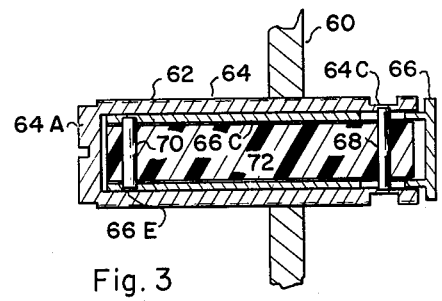
FIGURE 3 is a view in section of another arrangement of the embodiment of the invention.

The preferred embodiment of the invention shown in FIGURE 3 includes a wall section 60 in which the temperature compensating probe 62 is supported. Again this includes a sleeve member 64 which is threaded on the outside, and has its outer end 64a closed and slotted to accept a screw driver blade. The sleeve member 64 is threadably supported in the wall 60 to position the plate surface of the probe 66 at a desired distance from either the plate line or any other structure of a micro-wave cavity with which it is desired to establish a capacitive relationship with tuning preferences.

Figure 4:
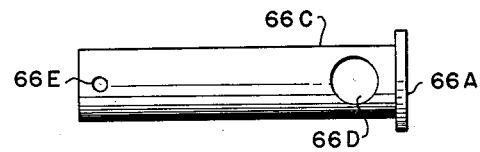
FIGURE 4 shows the structure of the tuning plate used in the embodiment of the invention shown in FIGURE 3.
Figure 5:
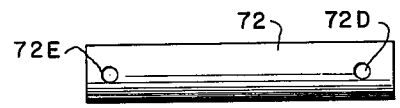
FIGURE 5 illustrates the structure of the thermal compensating material for the embodiment of the invention shown in FIGURE 3.

The sleeve member 64 does not have any internal threads but its internal portion is smooth. At its inner end, i.e., the end which extends into the cavity, a small opening 64c is provided through which a pin 68 may be driven. The probe 66 as may be better seen in FIGURE 4 has a plate end 66A which is joined to a cylindrical body 66c which is open at the end opposite the plate end 66a. The diameter of the cylindrical portion 66c is small enough to permit a sliding fit within the sleeve member 64. As may be seen in FIGURE 4 the cylindrical portion 66c of the probe has an aperture 66d which is large when compared to the size of the pin 68. There is an aperture 66e at the end of the probe which is near the closed end of the sleeve 64. A pin 70 can just be driven through this small transverse aperture 66e.

The cylindrical portion of the probe 66 has inserted therein a rod of the thermal acting material 72 which preferably is nylon. This nylon rod has two holes respectively 72d and 72e which are aligning with the transverse apertures 66d and 66e. The rod is first inserted in the cylindrical portion of the probe and the pin 70 is driven into aligned apertures 72e and 66e. This pin is made short enough so that the probe can then be inserted within the sleeve member 64 so that there is no notable interference with slideable motion with the probe therein. Then the pin 68 is driven through the transverse aperture 64c and the aligned aperture 66d into the aperture 72d of the rod 72.

In operation, when a change in temperature occurs the rod 72 will expand or contract and carry the probe with it closer to or away from such other structure with which it is in capacitive relationship. The sleeve member 64 is held in the wall of the micro-wave cavity device. The pin 68 holds the end of the rod 72 which is within the micro-wave cavity stationary relative to the sleeve member. Thus the other end of the nylon rod is free to move carrying with it the probe to which it is fastened by the pin 70. Because of the large opening 66d the probe will not be prevented from moving by reason of the pin 68 extending through it.

The length of the rod of thermal compensating material required can be readily computed by those skilled in the art since the effects of temperature changes on the tuning of the micro-wave cavity are calculable. The length of material required depends on a number of factors, all well understood by those skilled in the art, such as the dimensions of the tuning probe, the cavity, the frequency involved, and the amount of motion required for compensation. Other materials may be employed in place of the nylon, however, it is preferred because it provides the largest motion for a given change in temperature of substances which are relatively rigid.

As thus far described, this invention operates to compensate for temperature changes by moving the tuning probe in one direction as the temperature increases, and in the opposite direction as the temperature decreases. If a reverse compensating effect, which can be called a negative compensation, is desired, it can be simply obtained employing the teachings of this invention. Consider for example FIGURE 3:

Negative compensation may be simply achieved by exchanging the locations of the large and small holes 66e and 66d. The hole 64c in the sleeve is also moved to coincide with the location of the large hole which is in the probe. Now by interchanging the locations of the pins 68 and 70, the capacitive plate member will move in a reverse direction to that previously described to afford negative compensation. Similarly the location at which the clamping of the nylon sleeve occurs may be interchanged to obtain negative compensation. The length of the sleeve or rod determines how much motion is obtained in response to changes in temperatures.

There has been accordingly described and shown hereinabove the novel, useful, and simple arrangement for compensating for temperature variations in micro-wave cavity devices. Although this description has been made showing use of the embodiment of the invention in connection with micro-wave amplifiers or micro-wave cavity filters, it will be readily appreciated that those skilled in the art may employ the embodiment of the invention for effectuating compensation in other micro-wave cavity structures, such as klystron tubes and the like, without the parting from the spirit scope of this invention. It should be borne in mind that the thermal compensating device in accordance with this invention need not be the sole tuning device employed within a cavity. Other adjustable tuning slugs or devices may be employed for establishing the desired operating frequency and the invention may be employed for maintaining this operating frequency despite temperature variation. Also more than one tuning device of the type comprising the embodiment of the invention may be employed in a cavity if desired.

I claim:

1. A device for automatically compensating for de-tuning of a micro-wave cavity and an active amplifier element therein due to the effects of temperature changes comprising: a metal cavity; a tuning structure supported in one wall of said cavity, said tuning structure including; a metal outer sleeve, an inner nylon sleeve mounted within said outer sleeve and threadedly engaged with said outer sleeve adjacent its internal end, whereby, said inner sleeve moves with said outer sleeve during said temperature changes and the outer end of said inner sleeve rapidly moves relative to said outer sleeve and said cavity during said temperature changes; a metal tuning probe mounted within said inner sleeve and threadedly engaged therewith adjacent its outer end, said tuning probe in contact with the internal end of said outer sleeve; said tuning probe capable of rapid movement relative to said cavity and outer sleeve during said temperature changes, whereby said tuning probe movement compensates for dimensional de-tuning of said cavity and cancels any changes in the output capacity of said active amplifier element due to said temperature changes.

2. A device for automatically compensating for de-tuning of a micro-wave cavity and an active amplifier element therein due to the effects of temperature changes comprising: a cavity; a tuning structure supported to partially extend within said cavity, said tuning structure including; an outer sleeve having an elongated axial bore therein and a reduced collar portion adjacent the end of said sleeve within said cavity, said outer sleeve adjustably mounted in one wall of said cavity and being of the same metal material as said cavity wall; an inner nylon sleeve mounted within said axial bore and threadedly engaged with said outer sleeve adjacent said end within said cavity, whereby said inner sleeve moves with said outer sleeve during said temperature changes and the outer end of said inner sleeve rapidly moves relative to said outer sleeve and said cavity wall during said temperature changes; an elongated axial bore extending through said inner sleeve, an axial bore in said reduced collar portion and in-line with said last mentioned axial bore; a tuning probe slidably mounted within the bores of said reduced collar portion and inner sleeve and threadedly engaged with said inner sleeve adjacent its outer end; said tuning probe capable of rapid movement relative to said cavity wall and outer sleeve during said temperature changes, whereby movement of said tuning probe compensates for dimensional de-tuning of said cavity and cancels any changes in the output capacity of said active amplifier element.

References Cited in the file of this patent

UNITED STATES PATENTS

| | | |
|---|---|---|
| 2,486,129 | De Walt et al. | Oct. 25, 1949 |
| 2,779,004 | Bredall | Jan. 22, 1957 |
| 2,790,151 | Riblet | Apr. 23, 1957 |
| 2,883,630 | Wheeler | Apr. 21, 1959 |